United States Patent [19]

Ockerse et al.

[11] Patent Number: 5,041,926

[45] Date of Patent: Aug. 20, 1991

[54] TRACK POSITION SYNCOPATION CANCELLATION IN A DISK DRIVE

[75] Inventors: Harold C. Ockerse; Donald J. Fasen, both of Boise, Id.

[73] Assignee: Hewlett-Packard Company, Palo Alto, Calif.

[21] Appl. No.: 434,654

[22] Filed: Nov. 13, 1989

[51] Int. Cl.$^5$ .............................................. G11B 5/56
[52] U.S. Cl. ................................................ 360/77.05
[58] Field of Search ............... 360/77.02, 77.05, 77.07, 360/77.11

[56] References Cited

U.S. PATENT DOCUMENTS

| | | | |
|---|---|---|---|
| 3,534,344 | 10/1970 | Santana | 360/77.05 |
| 4,238,809 | 12/1980 | Fujiki et al. | 360/77.05 |
| 4,602,304 | 7/1986 | Fultz | 360/77.05 |
| 4,669,003 | 5/1987 | Bell et al. | 360/77.05 |
| 4,688,118 | 8/1987 | Knowles et al. | 360/77.05 |
| 4,811,135 | 3/1989 | Janz | 360/77.05 |
| 4,977,472 | 12/1990 | Volz et al. | 360/77.05 |

*Primary Examiner*—Robert S. Tupper

*Attorney, Agent, or Firm*—E. F. Oberheim

[57] ABSTRACT

A linear or rotary disk memory drive having provision for compensating or cancelling track position syncopation. Due to interference among the magnetic fields of magnetic head tracking such displaced magnetic code field in a magnetic memory disk, magnetic field intensities are displaced, producing an indication of a track center displaced from the actual track center. A magnetic head tracking such displaced mmagnetic fields is consequently displaced from track center, which is unacceptable. Four phases of magnetic dibits of servo code are recorded in each of at least four consecutive circumferential frames in a memory disk, in differing servo code formats or patterns of magnetic dibits. Magnetic head servo code signals derived from the magnetic fields of these servo code magnetic dibit patterns are logically processed to produce an AC signal representing track position syncopation which is cancelled by filtering, leaving servo code signals accurately reflecting the position of the magnetic head with respect to a track center.

10 Claims, 6 Drawing Sheets

TRACK POSITION SYNCOPATION CANCELLATION IN A DISK DRIVE

TECHNICAL FIELD

This invention relates generally to magnetic disk memory drives and more particularly to servo code dibit patterns, signal generation and signal processing for compensating or for cancelling track position syncopation in a disk drive.

BACKGROUND ART

High densities of information storage in disk drives require closely spaced concentric tracks on the disks in which the information is written. This requires precise positioning of the magnetic heads on the centers of the data tracks during a track following operation. Any magnetic head offset from track center degrades performance in reading or writing which is unacceptable. Disk drives conventionally comprise a stack of memory disks mounted in axially spaced positions on a common spindle to be rotated at a constant speeds. Corresponding tracks on the disk surfaces are cylindrically aligned. The magnetic heads are mounted at the ends of flexures on arms on a movable carriage. There is one magnetic head for each disk surface. These magnetic heads are radially and circumferentially aligned to be moved as a group to position a selected head at a selected track for reading or writing at that track location. In track seeking operations, the movable carriage moves the magnetic heads in a direction radially of the tracks. In a track following operation, the movable carriage maintains a magnetic head in a position centered with respect to a selected track. Tracks selected for reading or writing may have track numbers which when detected by the magnetic head are fed back to the controls for the movable carriage. In other instances, information is provided to the controls as to the number of track crossings required to move the magnetic head from a present track to a selected track.

Servo code is used to define the centers of tracks on the disks. Servo code is magnetically recorded in the form of magnetic dibits. The servo codes conventionally comprise either two phase or four phase magnetic dibit recordings which are radially aligned in a column for each phase in spaced end-to-end relation. The columns are in circumferentially spaced positions with the dibits in a column radially displaced with respect to the dibits in adjacent columns defining tracks. The difference in signals generated in the magnetic head scanning these magnetic dibits is used to develop power for the servo moving the movable carriage to center the magnetic head so that the signals become equal. Any amplitude distortion of these signals, by influences other than an off center position of the magnetic head with respect to magnetic dibits defining a specific track, results in the servo positioning the magnetic head in a radially offset position with respect to a track center, resulting in a condition called "track crowding", degrading track reading or writing performance.

High density packing of the magnetic dibits results in interference among the magnetic fields of the dibits. This is commonly called inter-symbol interference. This intersymbol interference is not uniform. The magnetic field at some dibits may be diminished and others may be increased in intensity. This variation in magnetic field intensity among the dibits will cause the servo system to position the magnetic heads away from true track center. This movement away from track center is not unidirectional and, hence, causes some tracks to appear more closely spaced and causes other tracks to appear further spaced. This can be referred to as track position syncopation. Offset of a magnetic head with respect to the center of a selected track degrades disk drive performance.

DISCLOSURE OF THE INVENTION

Acceptable servo system function in a disk drive requires that signal gain be uniform and that the magnetic head signal accurately indicate the physical position of the center of a track. This requires linear position reference signals with a stable and repeatable track position axis crossing point for accurate track following. The amount of magnetic head offset can vary significantly from one disk drive to another and is time varying in character making correction difficult. This invention provides a servo format which cancels adjacent pulse influence, timing skews and capacitor drop between pulse amplitude acquisitions, by taking advantage of the signal gating through a position signal differencer or demodulator.

This is accomplished using four phases of servo code identified as phases A, B, C and D which are recorded in four consecutive circumferential frames of differing magnetic dibit configurations. These dibits are arranged so that the servo signals developed by the magnetic head in traversing the dibits in all four frames on a single track, may be logically combined in differentially related pairs, synchronously with their development, in each of the four frames to cancel the signal amplitude modulation resulting from interference among the magnetic fields of the dibits, thereby producing servo signals accurately reflecting the position of the center of the track. This cancels track position syncopation.

Four phases of servo code A, B, C and D are recorded in dibit pairs A, B and C, D. Each pair defining a track center. The pairs of dibits A, B define a normal or inphase track center and the pairs of dibit C, D define a quadrature track center. The normal and quadrature tracks alternate in concentric disposition on the disk. The radial position of only one pair of dibits (A, B or C, D is reversed) in consecutive frames, in alternate pairs, providing the differing magnetic dibit configurations of servo code in each of the four frames.

The four frames define a block of servo code. Circumferentially spaced data and servo dibits d and s mark the beginning of each frame. These are differently configured than the magnetic dibits forming the servo code defining the tracks and thus have a different magnetic field influence upon adjacent magnetic dibits in the servo fields than the magnetic dibits in the servo fields have upon one another. The signals developed by the magnetic head in traversing the magnetic dibits defining a particular track result from sensing the magnetic fields of all four phases of the servo code. By differentially combining the signals in pairs A, B and C, D in each frame in different ways while the magnetic head traverses the four frames in a single block, effects of inter-symbol interference and, hence, track position syncopation, are cancelled.

The invention as described herein is practiced employing a dedicated servo disk and a dedicated servo magnetic head. Other disks in the disk stack containing data, may contain no servo code at all, or may be provided with an outer servo code track or band, or one or more bursts of servo code, which may be referenced periodically by the magnetic head thereat to determine if head/track offset exists that requires correction.

Track position syncopation resulting from other sources than the interference among the magnetic fields of the dibits, such as skewing of the head with respect to the track and capacitor voltage decay, called "droop", at the position error signal demodulator, is also cancelled in the logical processing of the position error signals.

BEST MODE FOR CARRYING OUT THE INVENTION

Figure 1A:
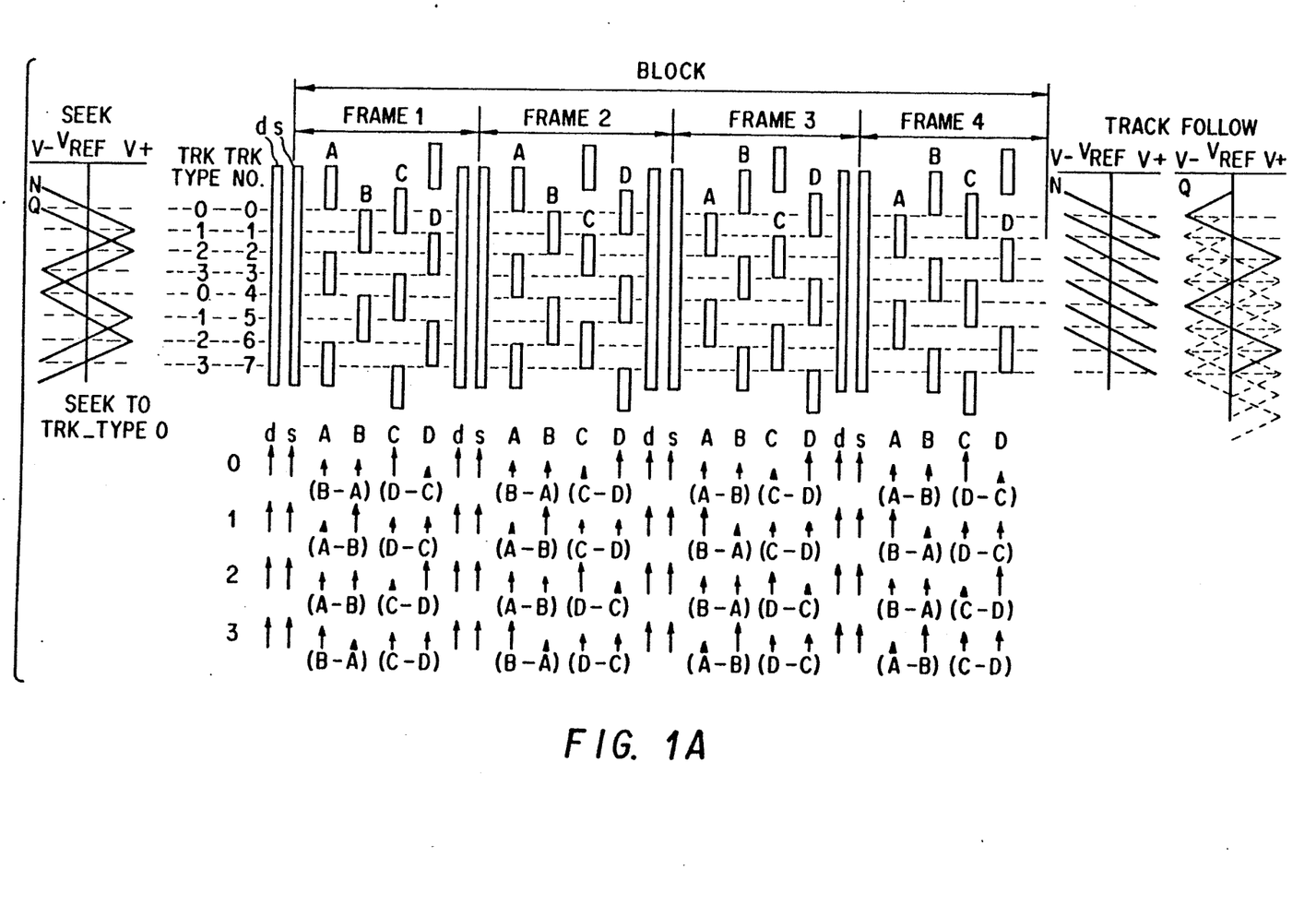
FIGS. 1A and 1B together illustrate a plot of the four phases of magnetic dibits defining the unique servo code format of this invention together with plots of approximate signal strength and timing signals for controlling logical processing of magnetic head signals, in relation to the magnetic dibits.
Figure 1B:
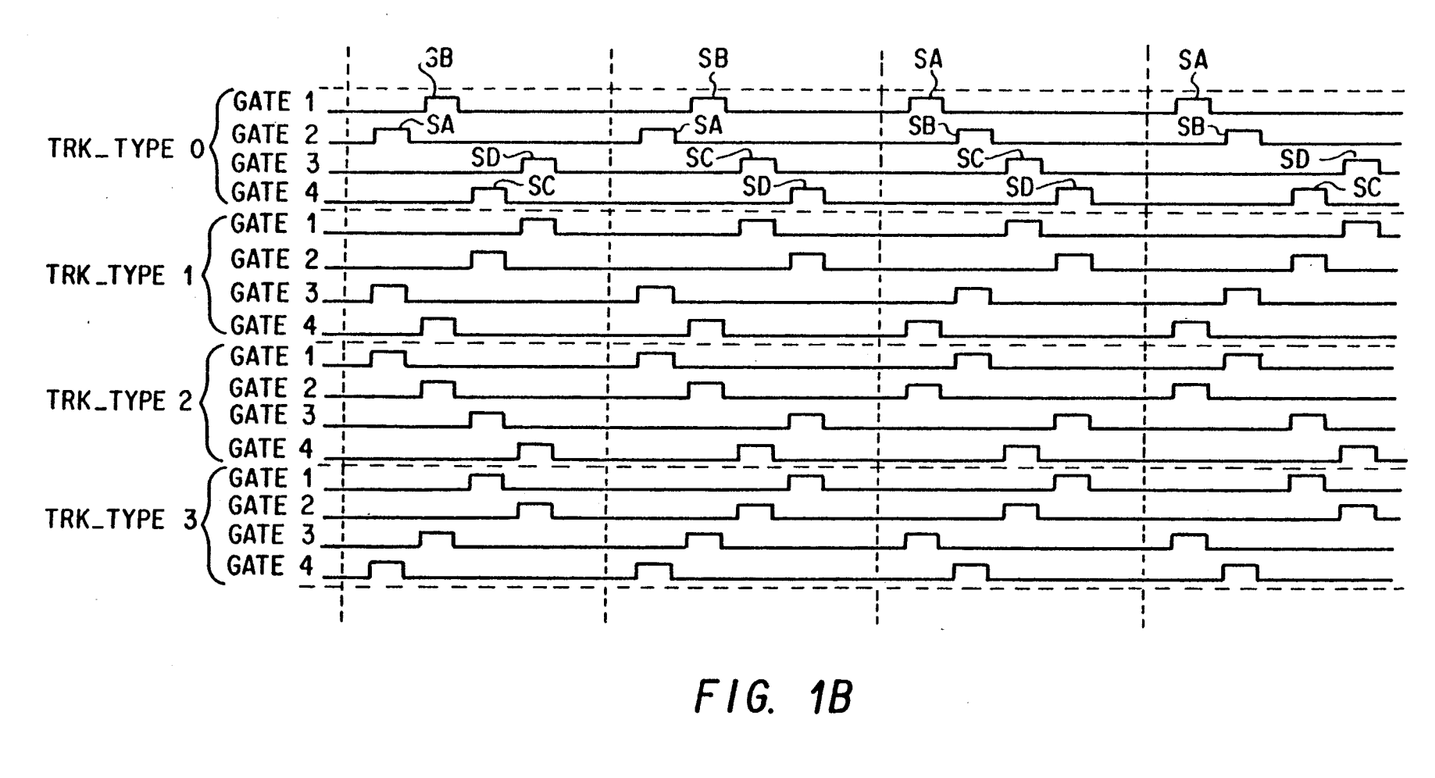

DC offsets in magnetic head position with respect to track center due to inter-symbol interference, head skew, or capacitor voltage decay during track following, is compensated or cancelled by providing a unique pattern of servo code and logically processing the magnetic head servo signals in a way to cancel the amplitude modulation of the magnetic head servo signals caused by the inter-symbol interference. FIGS. 1A and 1B illustrate the unique pattern of servo magnetic code. The plot illustrated spans eight (8) tracks in the servo code field. The pattern is repeated in groups of four (4) tracks for all tracks on the disk. The servo code pattern on the magnetic disk comprises at least four consecutive circumferential frames, Frame 1, Frame 2, Frame 3 and Frame 4, of circumferentially spaced radial columns of magnetic dibit recordings which define differing servo codes. Four phases of servo code A, B, C and D are recorded in the form of magnetic dibits. Each magnetic dibit has a radial dimension substantially corresponding to the widths of two adjacent tracks. These magnetic dibits are formed using a magnetic head having a pole which spans approximately two tracks. First and second phases A and B of circumferentially spaced magnetic dibits comprise a first servo code pair in which the magnetic dibits of the first phase A are radially aligned in positions which are radially spaced two track widths apart and the magnetic dibits of the second phase B are radially spaced in positions which are radially spaced two track widths apart and which are further radially displaced two track widths with respect to the magnetic dibits of the first phase A. Third and fourth phases C and D of circumferentially spaced magnetic dibits comprise a second servo code pair in which the magnetic dibits of the third phase C are radially aligned in positions which are radially spaced two track widths apart and the magnetic dibits of the fourth phase D are radially aligned in positions which are radially spaced two track widths apart and which are further radially displaced two track widths with respect to the magnetic dibits of the third phase C. The third phase C of magnetic dibits being circumferentially spaced from said second phase B of magnetic dibits. The magnetic dibits of the third phase C being radially displaced one track width with respect to the corresponding magnetic dibits of phase B of the magnetic dibits of the first servo code pair. This generally describes the magnetic dibit disposition and relationship with respect to all of the frames of the servo code pattern depicted.

The servo code patterns in the different frames are different. Moving from Frame 1 to Frame 2 the magnetic dibits of phases C and D of the servo code are reversed in radial position. This is the only change that is made. Moving from Frame 2 to Frame 3 the magnetic dibits of phases A and B are reversed in radial position with respect to that position occupied in Frames 1 and 2. Moving now from Frame 3 to Frame 4, it will be seen that the magnetic dibits of phases C and D are reversed in radial position with respect to their position in Frame 3. Each block of servo code comprises at least the four frames described in order to achieve the differing patterns of servo code which are needed to effect cancellation of track position syncopation in the servo signals which are developed. Each frame further comprises a data magnetic dibit denoted d and a synchronizing magnetic dibit denoted s. The magnetic data dibit d is used to encode information which may be read by the microprocessor and the synchronizing magnetic dibit s provides a synchronizing signal which times the reading of the servo code for all of the tracks. If this servo code is employed on a dedicated servo disk, the blocks of servo code will be consecutively circumferentially recorded around the disk. If employed as sampled servo code, blocks of data will follow the blocks of servo code.

It will be observed that the data and servo synchronizing magnetic dibits d and s, respectively, differ from the magnetic dibits of phases A-C in the servo field which define the respective tracks. Due to the high density recording of all of these magnetic dibits, the magnetic fields produced by the individual magnetic dibits will interfere. Interference between the magnetic fields of the magnetic dibits in phase A with a magnetic field produced by the servo synchronizing magnetic dibits s will produce one type of change in the magnetic fields of the magnetic dibits of phase A, and phase B, being further removed, may be little affected by the magnetic field of the servo synchronizing dibits, but being in proximity to the magnetic dibits of phase C, for example, its magnetic field may be strongly affected by the magnetic fields of phase c.

Figure 2:
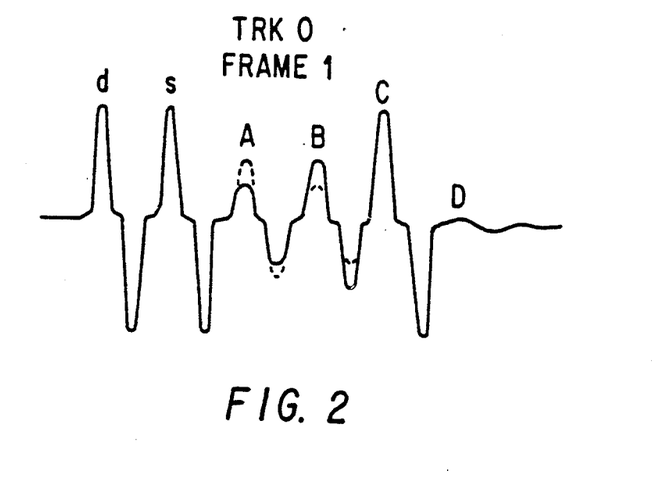
FIG. 2 is a plot of a typical composite magnetic head signal for a particular track at a particular circumferential location in the servo field.

A plot of a composite magnetic head signal resulting from traversal of track zero, 0, in Frame 1 of the field of servo code is seen in FIG. 2. The magnetic head signals resulting from the dibits d and s, are of greater amplitude than the immediately following signals derived from the magnetic dibits of phases A and B. If the head is centered on track zero, 0, in Frame 1, the head in crossing the dibits d and s overlaps a continuous section of each magnetic dibit and thus produces a large signal. In traversing the magnetic dibits of phases A and B, half of the magnetic head overlaps a dibit in phase A and thereafter the other half of the magnetic head overlaps a magnetic dibit in phase B. At track center, the signals A and B would be expected to be of the same amplitude, but due to the magnetic field interference described above, the magnetic head signal in phase A may be less than that which would be expected, while the signal in phase B might be greater than that which would be expected, in the absence of magnetic field interference. At phase C, the magnetic head overlaps the entire magnetic dibit and thus produces a strong signal in crossing phase C. In phase D, only an edge of the pole of the magnetic head passes the magnetic dibit of phase D and thus the phase D signal is quite small. It will be appreciated that this composite signal differs as the magnetic head moves from frame to frame because of the different patterns of the magnetic dibits in these frames. It is this difference in the signals produced by the magnetic head which is used in a position error signal demodulator to cancel the effects of track position syncopation. The position error signal demodulator will be discussed in connection with FIG. 3 at a later point.

At the left of the block of servo code in FIG. 1 is a plot of the normal (inphase) and quadrature signals developed during a seek mode of operation of the system, showing the track crossing signals in alignment with the tracks through the block of servo code.

On the right side of the block of servo code, the track following signals are plotted. These signals are plotted for that type of control in which the servo always tracks on the positive slope of the normal signal, N. Thus the N signals in this figure are plotted for each track position and have the same positive slope. The variation of the quadrature signal Q in this mode of operation is plotted at the right side of this figure. The solid line represents the signal for tracking along track zero, 0. The dotted lines indicate the positions of this signal with respect to other tracks. An alternative form of tracking which is commonly employed uses the signals N and Q from both the normal and quadrature phases for tracking. In this situation, tracking takes place on the positive slopes of the signals N and Q in sequence and on their negative slopes Q and N in sequence. When tracking on the positive slopes of the normal signal N, four different track types must be identified. When tracking on both the normal and quadrature signals N and Q, only one track type need be identified and any one of the four track types identified herein will suffice in such a situation. The invention, however, is disclosed in connection with the use of the technique of tracking only on the positive slope of the normal signal N and, hence, the four track types and their use will be described.

Beneath the block of servo code in FIG. 1, arrows are used to plot the approximate field strengths of the magnetic fields of all of the magnetic dibits in the block of servo code. Arrows of differing length represent the approximate strengths or magnitudes of the individual magnetic fields in each of the four phases of servo code A, B, C and D and the magnetic fields of the data and servo magnetic dibits. In plotting these magnetic field strengths, it is assumed that the magnetic head is on track center and that there is no distortion in the magnetic fields. Thus, for example, in track zero, 0, in phases A and B, the arrows are assumed to be of the same length such that the difference in the signals developed by the magnetic head would be zero, indicating that the magnetic head is on track center. The four track types are identified 0, 1, 2 and 3, as seen at the left of the servo field. These four track types repeat in the sequence shown, in groups of four tracks, for all of the tracks on the disk. The logical combination of the signals in the four phases A, B, C and D of the servo code, for each of the four track types, is shown in the field of arrows. Phases A and B represent one pair and phases C and D represent a second pair, in each frame of the four frames indicated. Viewing the signal pair comparisons with respect to track zero, 0, for example, as indicated in the pairs below the arrows associated with track zero, 0, it will be seen that amplitude modulation of the signals in phases A and B, Frames 1 and 3, is cancelled by their reversed differential comparison. Similarly, amplitude modulation of the signals in phases C and D, Frames 2 and 4, is cancelled by their reversed differential comparison. The logical combination of these signals is shown for the track types 0, 1, 2 and 3.

Timing for effecting the logical combination of these signals, as indicated in the field of arrows, is depicted in the timing signal diagram at the bottom of FIG. 1. The position error demodulator, to be described in connection with FIG. 3, involves four gates, G1-G4, having gate enabling input circuits, Gate1 through Gate4, respectively, for gating different phases of the composite signals of the type of FIG. 2, to produce a signal for controlling the servo in the track following mode, in which the affects of amplitude modulation of the composite signal due to inter-symbol interference, has been cancelled. In the timing signal diagram, the gating sequence for the four gates of the position error signal demodulator for each of the four track types is indicated. Note here that the gate signals SA, SB, SC and SD are aligned with the respective phases of the magnetic dibits and that the A, B, C and D phases of the composite signal therefore will be switched among the gates on the Gate1 through Gate4 gate enabling input circuits. Looking at the timing signals for the gate enabling input circuits Gate1 and Gate2, for example, in track type zero, 0, in Frames 1 and 2, and referring now also to FIGS. 3 and 4, the phase A signal SA of the composite signal on the gate enabling input circuit Gate2, will be gated at gate G2 during Frames 1 and 2 and that the phase B signal SB on the gate enabling input circuit Gate1, will be gated at gate G1 in these two frames. Now looking at Frames 3 and 4, the phase A signal SA on the gate enabling input circuit Gate1, is gated at gate G1 and the phase B signal SB on the gate enabling input circuit Gate2 is gated at gate G2, which reverses the servo signal comparison. This is the way in which all of the signals are switched or reversed in their differential comparison, as indicated in the field of arrows for each track type. Note also that the selection of a track type identifies a particular track in each group of four tracks, as seen at the left of the servo code field in FIG. 1.

Figures 3, 4, 5:
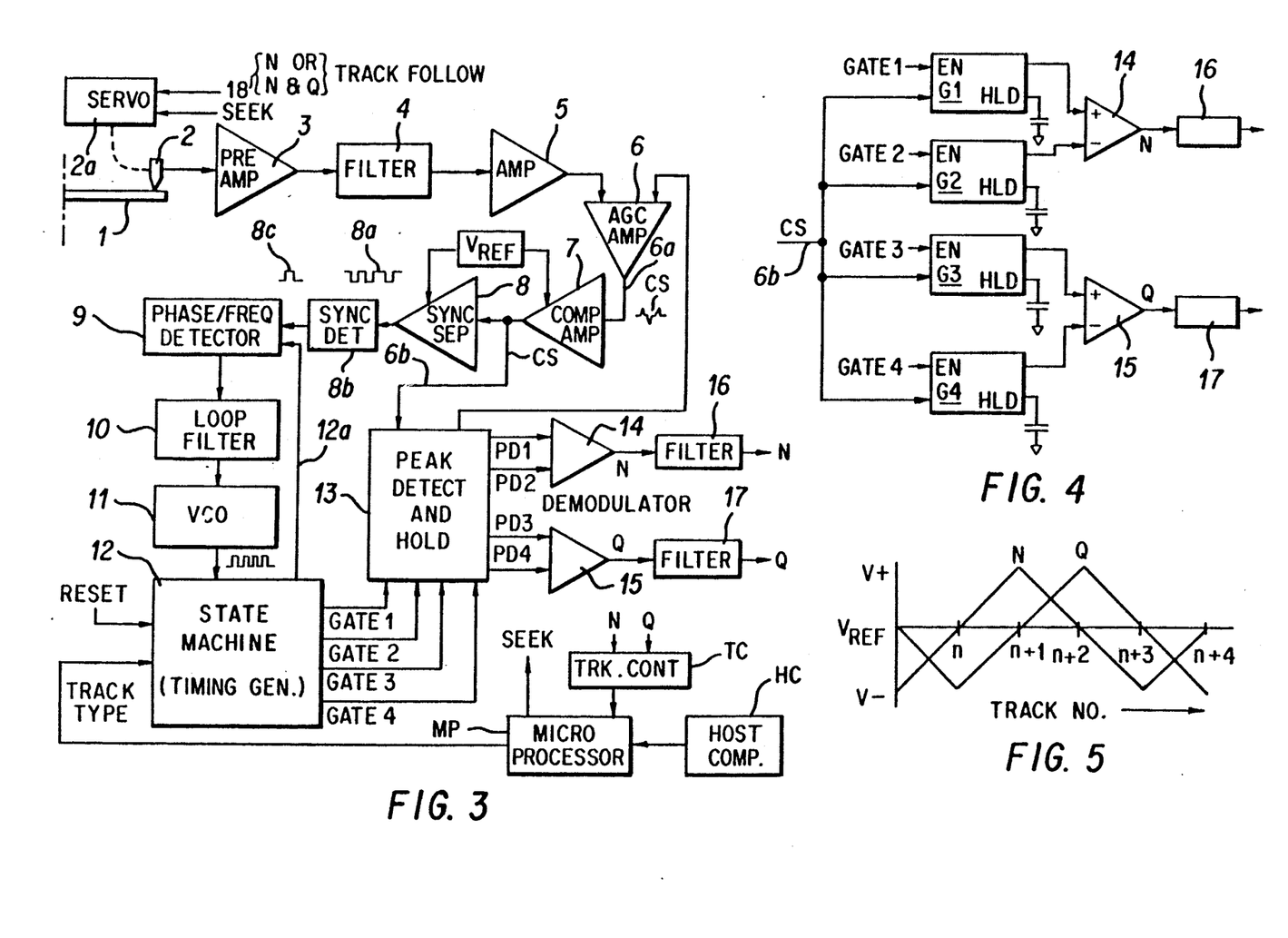
FIG. 3 is a block diagram of a disk drive control system for implementing the logical processing of the magnetic head signals.
FIG. 4 is a detail of the magnetic head signal demodulator of FIG. 3.
FIG. 5 illustrates the normal (inphase) and quadrature track crossing signals at the output of the demodulator.

A servo system for implementing the logical combination of the magnetic head signals in the composite signal CS is illustrated in FIG. 3. In this figure, the disk drive is only schematically illustrated comprising a single disk 1 rotatable about an axis 1a. A magnetic head 2 is supported by an actuator 2a which is controlled by a servo 2b which is under the control of a demodulator circuit. Typically a host computer, HC, calls out requests for information to a microprocessor MP which provides input for the servo system in the form of track type and track number or track crossings to count from a present track to a target track, for controlling the head actuator servo 2b. Track type can be simply determined by the two least significant bits of the binary track number.

Signals developed by the magnetic head 2 are coupled to a read amplifier circuit which comprises a pre-amplifier 3, a filter 4 for filtering signal noise and an amplifier 5 for amplifying the filtered differential head signal. Automatic gain control required by the servo is provided by an automatic gain control amplifier 6 which receives the filtered and amplified signal from the filter 4. The signal at the output of the automatic gain control amplifier 6 is coupled by a circuit 6a as input to a composite signal amplifier 7. The output of the composite signal amplifier 7 is coupled as input to a synchronizing signal circuit comprising a sync separation amplifier 8 and a sync detector circuit 8b, and is also coupled as input to a peak detect and hold circuit 13. Gain control is achieved by feeding back a gain adjust signal from the peak detect and hold circuit 13 via a circuit 13a to one input of the automatic gain control amplifier 6. The purpose of this feedback being to maintain the level of signals which are coupled to the servo within a limited amplitude range. The amplifiers 7 and 8 each have a reference voltage VREF coupled to them to offset the output signals to provide variable amplitude DC signals in the single polarity output circuits of these amplifiers. The composite signal amplifier 7 converts the differential signal ABCD into a buffered single-ended signal for the peak detector 13. The DC baseline of the composite signal is VREF. The sync separation amplifier 8 is a threshold comparator with hysteresis which passes pulses from the composite amplifier above a set threshold. The peak detector circuit 13 captures the peak signal amplitude of the dibit pulse. The gates G1 through G4 are controlled by the inputs on the gate enabling input circuits, Gate1 through Gate4. The output of the sync separator 8 is a rectangular wave signal 8a in which the square wave pulses are synchronized with the A, B, C and D phases of the composite signal CS. A sync detector 8b, produces a square wave output signal or pulse 8c, FIG. 6, once per frame, coupled as input to a phase/frequency detector circuit 9 which is used for synchronizing the loop. The output of the phase and frequency detector 9 is filtered by means of a loop filter 10 which produces an output signal for synchronizing a voltage controlled oscillator 11 with the composite signal CS. A state machine 12 which functions as a timing signal generator in the system is driven by the free running oscillator 11. The state machine 12 comprises a conventional counter arrangement which functions as a timing signal generator producing the timing signals SA, SB, SC and SD in particular frames of the servo code. It also produces a feed back signal via the circuit 12a, to the phase and frequency detector 9 for synchronizing and maintaining the counting cycle in phase with the composite signal CS.

Track position syncopation (or inter-symbol interference) cancellation begins with the state machine, the output of the state machine 12 comprises the four (4) gate enabling circuits marked Gate1, Gate2, Gate3 and Gate4, which are coupled as input to the peak detect and hold circuit 13 forming part of the position error signal demodulator. Refer also to FIG. 4 for further details of the demodulator. These gate enabling circuits, Gate1, Gate2, Gate3, Gate4, carry the timing signals SA, SB, SC and SD as indicated in the timing signal diagram at the bottom of FIG. 1. Thus, for example, in track zero, 0, track type zero, 0, the Gate1 circuit, during Frames 1 and 2 of the servo code block, carries the signal SB and in Frames 3 and 4 carries the signal SA. The Gate2 circuit, in Frames 1 and 2, carries the signal SA and in Frames 3 and 4 carries the signal SB. The Gate3 circuit in Frame 1 carries the signal SD, in Frames 2 and 3 carries the signal SC and in Frame 4 carries the signal SD. The Gate4 circuit in Frame 1 carries the signal SC, in Frames 2 and 3 carries the signal SD and in Frame 4 carries the signal SC.

The peak detect and hold circuit 13, responding to these input signals and to the composite signal CS via circuit 6b from the composite amplifier 7, produces corresponding output signals which exist simultaneously and continuously on its circuits PD1, PD2, PD3, PD4. These are connected in pairs PD1, PD2 and PD3, PD4 as input to the respective differential amplifiers 14 and 15. Thus the phase A and phase B signals are reversibly differentially compared in the differential amplifier 14 and the C and D signals are reversibly differentially compared in the differential amplifier 15, to produce, respectively, the normal (inphase) and quadrature output signals N and Q, respectively, which after filtering by filters 16 and 17 to remove the AC component due inter-symbol interference and capacitive droop are used to control the servo 2b. In a track centered, track following mode on tracks 0, 2, 4, etc., the differential comparison of the signals A and B is zero and the output signal N is zero. In a track centered track following mode on tracks 1, 3, 5, etc., the differential comparison of signals C and D is zero and the quadrature output signal Q is zero. During a seek operation, in which the magnetic head is crossing the tracks, the time phase relationship of the signals N and Q in crossing tracks n, n+1, and so forth, appear substantially as indicated in FIG. 5.

Thus in a track following mode of operation, where track following is desired on the positive slope of the normal signal N, each of four track types must be identified. The dedicated servo disk, as herein described, does not have track numbers recorded in the respective tracks. Thus the microprocessor, MP, when receiving a request for information from the host computer, HC, provides a count of track crossings to get from the present track on which the dedicated head is track centered to the target track whereas the requested information is stored. The microprocessor stores the track type for the different track numbers, the last two bits of which identifies the track type. Therefore, the microprocessor using a particular track number, provides the track type to the state machine 12. Track numbers are listed to the left of the track types at the servo code in FIG. 1. These track numbers begin with track zero, 0. Thus, with each group of four tracks, the track type count repeats, track type zero, 0, being associated with tracks 0, 4, etc., track type 1 with tracks 1, 5 and so forth. Signals N and Q are coupled as input to a counter TC. The counter TC provides the track crossing count to the microprocessor. The microprocessor produces a SEEK signal for the servo 2a for accessing the target track after which track following on the N or the N and Q signals takes place, depending upon the type of track following which is selected.

As noted, the peak detector circuit 13 captures the peak signal amplitude of the dibit pulses. The gates are controlled by the gate input circuits Gate1 through Gate4. Further details of the peak detector and demodulator circuit appear in FIG. 4. Gate enabling input circuits Gate1 through Gate4 are connected respectively to the gate enabling terminals EN of the gates G1, G2, G3 and G4. Gates G1 through G4 are connected in pairs G1, G2 and G3, G4 in the input circuits to the amplifiers 14 and 15. Each of gates G1 through G4 have the composite signal, CS, coupled as input thereto via the circuit 6b. Thus, referring to track 0, track type zero, 0, in Frame 1 of FIG. 1, the signal SA is coupled to the enabling terminal of the gate G2 by the Gate2 enabling input circuit, enabling this gate. The signal SB is coupled to the enabling terminal of the gate G1 by the Gate1 enabling input circuit. Thus the enabling of these gates G1 and G1 is synchronous with the occurrence of the A and B signal phases of the composite signal CS input to the peak detector and demodulator. These signals are stored or held on the capacitors C2 and C1 at the input of the amplifier 14 in the desired B-A differential comparison relationship. The signal SD appears in the Gate3 enabling input circuit of the gate G3. The signal SC appears in the Gate4 enabling input circuit of the gate G4. Thus, the C and D signal phases of the composite signal CS are stored on the capacitors C4 and C3, respectively, at the input to amplifier 15 in the subtractive relationship D-C. Processing of the magnetic head signals through each of the four frames of servo code of the block illustrated in FIG. 1, can be followed using this procedure. The general equations defining the signals N and Q are given below.

$$POS\ A = N = Gain1\ (PD1 - PD2) + VREF$$

$$POS\ B = Q = Gain2\ (PD3 - PD4) + VREF$$

Where ideally Gain1 = Gain2

PD1 is the peak detector voltage from the peak detector 1 circuitry. This is the voltage appearing across the peak detector and hold capacitor C1. PD2, PD3 and PD4 are similarly construed.

Track following in the disclosed embodiment of this invention will always occur on the output signal N, of the N channel, using the normal signal N which has a positive slope. The signal Q remains unchanged between track following and track seeking processes (or is adjusted so that position B, POS B, is always valid as the Q output).

Figure 7:
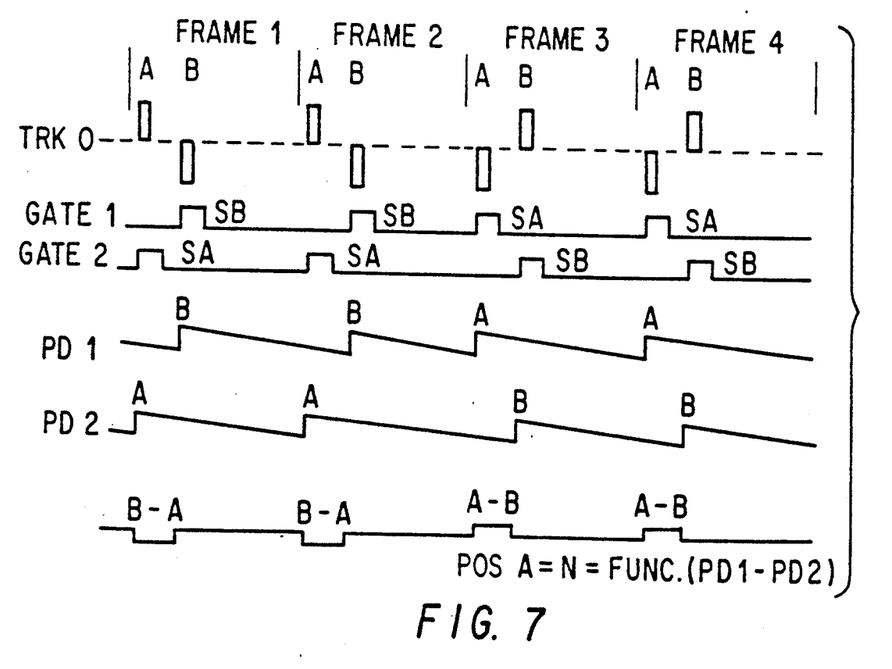
FIG. 7 is a plot of droops or decay of capacitor voltage in capacitors in the demodulator in timed relation to signal gating.

During the intervals of storage of the voltages PD1 through PD4 of phases A, B, C and D of the composite signal CS on the capacitors C1, C2, C3, C4 in the respective comparative sequences, leakage at the capacitors will cause the voltage across the capacitors to drop. This is referred to as capacitor droop. This can result in an error in the servo signal voltage. However, the logical combination of the various servo signal phases and the timing of these in the input to the differential amplifiers 14 and 15 also cancels capacitor droop. The way in which this is accomplished for tracking on the signal N is illustrated in FIG. 7, which relates the capacitor voltage droop to the gate enabling signals SA and SB in the enabling circuits of gates G1 and G2, which in turn are related to the A and B phases of the magnetic dibits of the servo code in FIG. 1. This is done for track zero, 0, track type zero, 0, in Frames 1 through 4 of FIG. 1. The signals SA and SB which appear on the Gate1 and Gate2 gate enabling input circuits, in FIG. 4, are indicated in FIG. 7. The capacitor voltages are represented as PD1 and PD2. The peaks of these voltages are associated with the occurrence of the A and B phases of the servo code. The decay in the magnitude of the capacitor voltage, that is the voltage droop, is depicted in the intervals between the applications of the gate enabling signals SA and SB. It will be observed, that the differential comparison of signals B-A in track zero, 0, Frames 1 and 2, results in a normal signal N, having the negative square waves in Frames 1 and 2, and having the positive square waves in Frames 3 and 4. Capacitor droop among the capacitors, in the intervals of comparison, is about the same so that the subtraction of these voltages by the differential amplifier 14 is zero, or substantially zero. Similar considerations apply with respect to capacitor droop compensation for signals C and D.

Briefly reviewing track position syncopation cancellation as discussed hereinabove, and as an example, in Frame 1, track zero, 0, during track following, the peak of a servo signal in phase A is assumed to be smaller because of the influence of the field from the dibit S, and the peak of the servo signal B is assumed to be larger because of the influence of the magnetic field of the dibit C. This means the resulting position signal for track zero, 0, in this frame is N=func.(B-A) which is larger than desired. In track zero, 0, Frame 4, however, N=func.(A-B) which is smaller than desired. Over the length of the four frames (BLOCK) these two offsets cancel through low pass filtering, leaving the desired normal signal N, cancelling track position syncopation which would have occurred.

Offset of the magnetic head from track center due to capacitive voltage droop during the delay between the gate enabling signals SA and SB or SC and SD is cancelled over the four frames, as indicated in FIG. 7.

Figure 6:
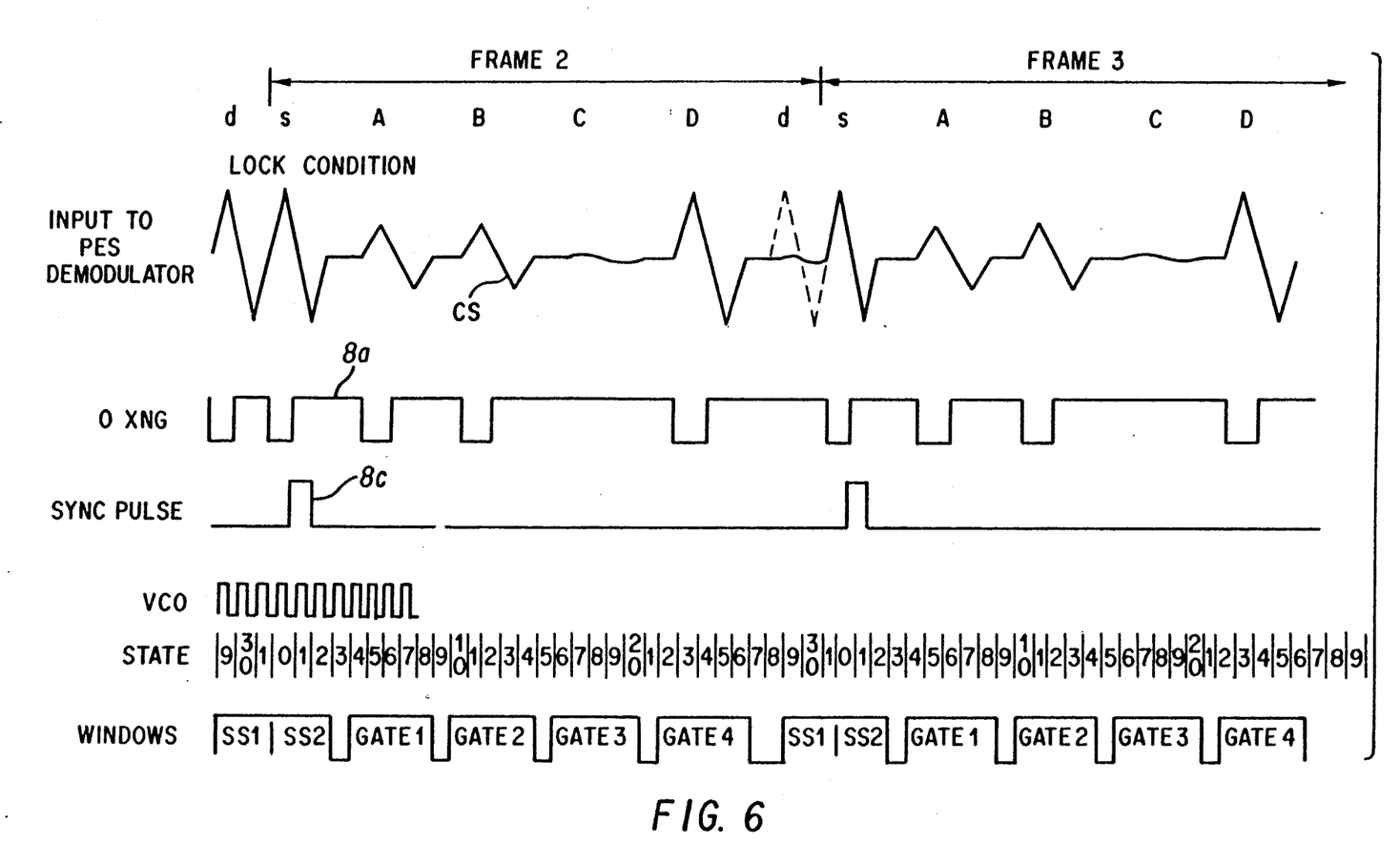
FIG. 6 is a plot of additional timing signals in timed relationship to plots of magnetic head composite signals.

Further explanation of signal timing appears in FIG. 6. Signal timing is shown in FIG. 6 only in relation to track zero, 0, Frames 2 and 3 of FIG. 1. The servo code signals developed by the magnetic head in traversing Frames 2 and 3 are illustrated at the top of FIG. 6 and correspond to the signals developed in traversing track zero, 0 through these frames. The data bit signal d is absent at the end of Frame 2 indicating the absence of the data magnetic bit at that location on the disk. This indication can be used to identify a circumferential position on the dedicated disk from which (BLOCKS) may be counted and to locate the beginning of the servo block of four frames (RESET to STATE counter). Not being at the beginning of a block at Frame 1, it is used here only as a point of discussion to demonstrate the purpose. The composite signal CS is converted to an offset square wave denoted 7a, as discussed earlier, by the composite amplifier 7 in the block diagram of FIG. 3. The synchronizing pulse 8c is developed by the sync detector 8b in FIG. 3. The sync pulse 8c, via the phase/frequency detector 9 and the loop filter 10 produces the synchronizing signal for the free running voltage controlled oscillator 11, which cycles the counter of the state machine through the numbered count cycles marked "STATE". The electrical state of the counter with each cycle of the voltage controlled oscillator is indicated as the STATE signal. In its count cycle of 32 counts, four gate windows are generated. These are marked Gate1, Gate2, Gate3 and Gate4, to identify these windows with the respective similarly identified gate enabling input circuits. Each window spans five cycles of the VCO. These are the windows in time in which the gate enabling voltages SA, SB, SC and SD selectively appear at the enabling terminals EN of the gates G1, G2, G3 and G4 of FIG. 4. It will be observed that these time windows are synchronized in time with the development of the A, B, C and D phases of the servo code voltages by the magnetic head. Precise synchronization of the counters of the state machine 12 is guaranteed in a feedback signal via circuit 12a from the state machine to the phase/frequency detector 9 to precisely maintain the count cycle of the state machine in phase with the sync pulse 8a.

Figure 8:
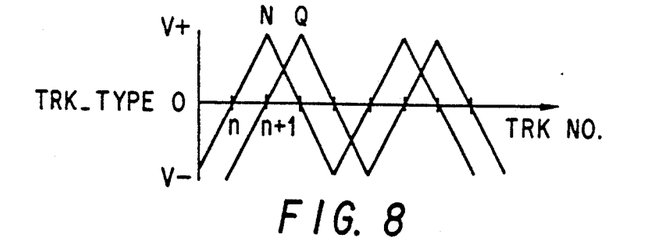
FIGS. 8 and 9 illustrate the relationship of typical track crossing signals for differing types of tracks of servo code.
Figure 9:
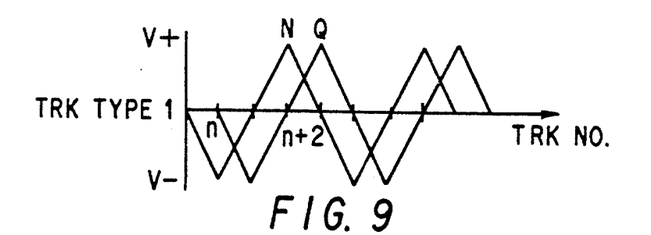

FIGS. 8 and 9 show the shift in track position of the normal and quadrature phase signals at the output of the demodulator resulting from the selection of track type. The signals for track types zero, 0, and 1 are shown in these respective figures and illustrate that by the selection of the track type the signals are shifted so that track following always occurs on the positive slope of the normal signal N.

Figure 10:
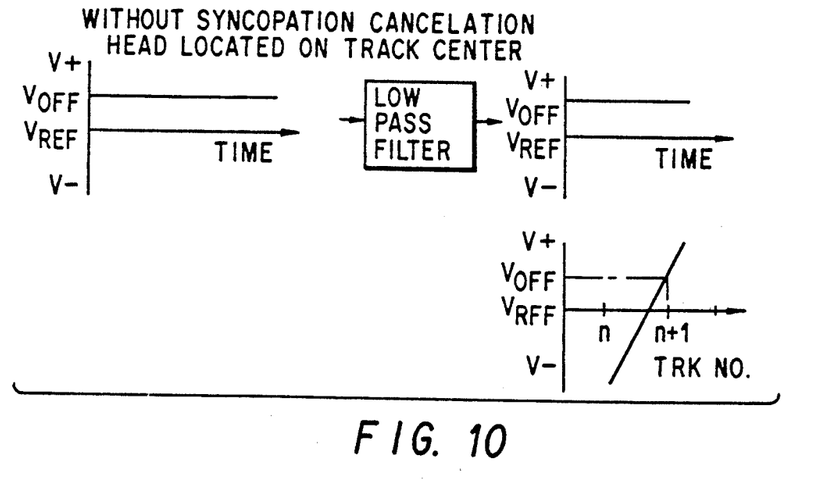
FIG. 10, graphically illustrates track position, offset signals resulting from track position syncopation, which is uncorrected, and FIG. 11 graphically illustrates the way in which track position syncopation is cancelled in accordance with the teachings of this invention.

FIG. 10 illustrates system performance without syncopation cancellation, showing the DC signal offset, in the figure at the top left, when the magnetic head is assumed at track center. Low pass filtering is ineffective to correct such DC offset, as seen at the top right of FIG. 10. The result, as seen in the bottom right of FIG. 10, is a shift of the normal signal N so that its indication of track crossing occurs at a location shifted from actual track center, here indicated as $V_{OFF}$.

Figure 11:
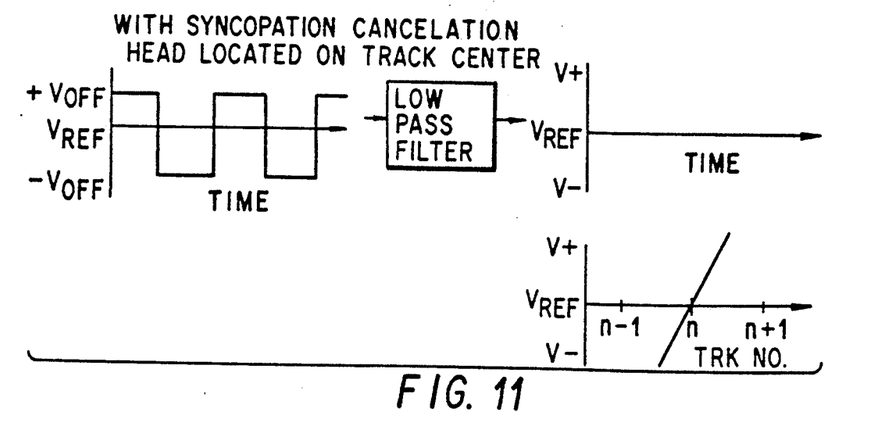

FIG. 11 illustrates the improved performance of this invention obtained with syncopation cancelation. The signal plot at the top left represents the AC component, of known frequency, of the track position signal, with the magnetic head assumed at track center. This is filtered out by the low pass filter, leaving the DC component VREF, as seen at the top right of FIG. 11. The positive slope of the normal signal N at VREF now intersects the track N at track center.

Such signal syncopation cancellation requires the use of the four frames of servo code illustrated in FIG. 1. Without the use of these four frames together with the described logic signal processing, an offset in the normal signal still exists after filtering as demonstrated in FIG. 10.

Industrial Applicability

The method and apparatus described herein for compensating servo signal syncopation is generally useful in any magnetic memory system which uses discreet magnetic dibit recordings in servo code patterns to define track centers.

What is claimed is:

1. In a magnetic disk drive, the improvement comprising:
a magnetic memory disk having at least four consecutive circumferential frames, each of four phases of radially aligned magnetic dibits defining a servo code, recorded in a surface of said disk;
the magnetic dibits of a first phase pair in each frame defining a normal track in the surface of said disk;
the magnetic dibits of a second phase pair in each frame defining a quadrature track in the surface of said disk;
the magnetic dibits in only one phase pair being reversed in radial position, in alternate phase pair sequence, in consecutive frames, to define a different servo code pattern in each frame.

2. In a magnetic disk drive, the improvement comprising:
a magnetic memory disk having at least four consecutive circumferential frames of servo code, each having four circumferentially spaced radial columns of radially spaced magnetic dibits;
each magnetic dibit having a radial dimension corresponding to the width of two adjacent tracks, the magnetic dibits in the respective columns being spaced in end-to-end relationship two track widths apart;
the respective columns defining phase 1, phase 2, phase 3, and phase 4 of magnetic dibits;
the magnetic dibits of phase 2 being radially displaced two track widths with respect to the magnetic dibits of phase 1;
the magnetic dibits of phase 4 being radially displaced two track widths with respect to the magnetic dibits of phase 3;
the magnetic dibits of phase 3 being radially displaced one track width with respect to the magnetic dibits of phase 2;
phases 1 and 2 of magnetic dibits defining a first servo code pair;
phases 3 and 4 of magnetic dibits defining a second servo code pair;
the magnetic dibits of only one servo code pair being reversed in radial position in alternate servo code pairs, in consecutive circumferential frames of servo code to provide four frames of servo code of differing magnetic dibit format.

3. In a magnetic disk drive, the improvement comprising:
a magnetic memory disk having at least four consecutive circumferential frames of servo code, each having four circumferentially spaced radial columns of radially spaced magnetic dibit recordings defining four phases of servo code in each frame;
each magnetic dibit having a radial dimension substantially corresponding to the width of two adjacent tracks;
first and second phases of said four phases of servo code comprising a first servo code pair in which the magnetic dibits of the first phase are radially spaced two track widths apart, and the magnetic dibits of the second phase are radially spaced two track widths apart and which are further radially displaced two track widths with respect to the magnetic dibits of said first phase;
third and fourth phases of said four phases of servo code comprising a second servo code pair in which the magnetic dibits of the third phase are radially spaced two track widths apart and the magnetic dibits of said fourth phase are radially spaced two track widths apart, and which are further radially displaced two track widths with respect to the magnetic dibits of said third phase;
the magnetic dibits of said third phase being radially displaced one track width with respect to corresponding magnetic dibits of one phase of magnetic dibits of said first servo code pair and the magnetic dibits of said fourth phase being radially displaced one track width with respect to corresponding magnetic dibits of the other phase of said first servo code pair;

the magnetic dibits of only one servo code pair being reversed in radial position, in alternate servo code pairs, in consecutive circumferential frames of servo code, to provide four frames of servo code of differing magnetic dibit format.

4. The method of cancelling track position syncopation, using a servo code signal pattern derived from magnetic servo code in a rotatable magnetic disk of a disk drive, comprising:

providing four different, consecutive, circumferential frames of servo code patterns of magnetic dibits in said magnetic disk;

producing four different consecutive servo code signal patterns of individual signals from said magnetic dibit patterns, synchronously with rotation of said disk;

processing individual signals of said servo code signal patterns in selected pairs to produce a servo signal having an AC signal component representative of the track position syncopation; and removing said AC signal component from said servo signal.

5. The method of cancelling track position syncopation using a servo code signal pattern derived from magnetic servo code in a rotatable magnetic disk of a disk drive, comprising:

providing four different, consecutive, circumferential frames of servo code patterns of magnetic dibits in said magnetic disk;

producing four phases of four different consecutive servo code signal patterns of individual signals from said magnetic dibit patterns, synchronously with rotation of said disk;

differentially combining signals from consecutive pairs of phases of servo signals to produce two output signals, each having an AC signal component; and removing said AC signal component from each of said output signals.

6. A magnetic disk drive in which track position syncopation, due to interference among the magnetic fields of servo code magnetic dibits, is cancelled, comprising:

a rotatably mounted magnetic memory disk having a surface of magnetic material;

individual tracks of magnetic dibits in said surface, defining four consecutive, circumferential frames of differing servo code patterns of magnetic dibits;

a magnetic head for producing individual servo code signals from the magnetic fields of said magnetic dibits during rotation of said disk;

servo means responsive to said servo code signals for controlling said magnetic head to track follow along a selected track through said four consecutive circumferential frames of servo code;

logic circuit means for producing differing signal patterns of individual logic signals, each individual logic signal being synchronous with a servo code signal of each of said four consecutive circumferential frames of servo code; and circuit means responsive to said logic signals for cancelling the affects of magnetic field interference on said servo code signals to cancel track position syncopation.

7. The magnetic disk drive according to claim 6, in which:

each frame comprises four phases of magnetic dibit patterns.

8. The magnetic disk drive according to claim 7, in which:

the phases of the four phases of magnetic dibit patterns are arranged in consecutive, circumferentially spaced phase pairs;

9. The magnetic disk drive according to claim 8, in which:

each phase of said four phases comprises a radially disposed column of magnetic dibits in spaced end-to-end relationship.

10. The magnetic disk drive according to claim 9, in which:

the magnetic dibits of one phase pair are reversed in radial position, in alternate phase pairs, in consecutive circumferential frames, to provide four frames of differing servo code patterns of magnetic dibits.

* * * * *